United States Patent
Heffington

(10) Patent No.: US 8,171,843 B1
(45) Date of Patent: May 8, 2012

(54) COFFEE MAKER WITH AUTOMATIC METERED FILLING MEANS

(76) Inventor: Matthew A. Heffington, Loris, SC (US)

( * ) Notice: Subject to any disclaimer, the term of this patent is extended or adjusted under 35 U.S.C. 154(b) by 585 days.

(21) Appl. No.: 12/380,725

(22) Filed: Mar. 3, 2009

Related U.S. Application Data

(60) Provisional application No. 61/067,714, filed on Mar. 3, 2008.

(51) Int. Cl.
- A47J 31/04 (2006.01)
- A47J 31/10 (2006.01)
- A47J 31/41 (2006.01)
- A47J 31/44 (2006.01)

(52) U.S. Cl. ........ 99/282; 99/283; 99/285; 99/288; 99/305

(58) Field of Classification Search ........ 99/280, 99/282, 283, 285, 288, 304, 305, 307
See application file for complete search history.

(56) References Cited

U.S. PATENT DOCUMENTS

| | | | | |
|---|---|---|---|---|
| 3,332,337 A * | 7/1967 | Lowry | ............ | 99/282 |
| 3,336,856 A * | 8/1967 | Martin | ............ | 99/288 |
| 3,343,478 A * | 9/1967 | Hausam | ............ | 99/283 |
| 3,347,150 A * | 10/1967 | Hrabe | ............ | 99/283 |
| 3,443,508 A * | 5/1969 | Reynolds et al. | ............ | 99/282 |
| 3,494,276 A * | 2/1970 | Martin | ............ | 99/282 |
| 3,518,933 A * | 7/1970 | Weber | ............ | 99/283 |
| 3,793,934 A | 2/1974 | Martin | | |
| 4,069,750 A * | 1/1978 | Kemp | ............ | 99/280 |
| 4,094,233 A | 6/1978 | Martin | | |
| 4,328,740 A * | 5/1982 | McDonough et al. | ............ | 99/295 |
| 4,406,217 A * | 9/1983 | Oota | ............ | 99/280 |
| 4,608,916 A * | 9/1986 | Becker et al. | ............ | 99/283 |
| 4,713,253 A | 12/1987 | Stone, Jr. | | |
| 4,825,758 A * | 5/1989 | Snowball et al. | ............ | 99/282 |
| 4,872,403 A * | 10/1989 | LaGesse et al. | ............ | 99/280 |
| 4,967,648 A * | 11/1990 | Helbling | ............ | 99/280 |
| 5,001,969 A * | 3/1991 | Moore et al. | ............ | 99/282 |
| 5,133,247 A * | 7/1992 | Pastrick | ............ | 99/295 |
| 5,183,998 A * | 2/1993 | Hoffman et al. | ............ | 219/492 |
| 5,285,718 A | 2/1994 | Webster et al. | | |
| 5,694,115 A * | 12/1997 | Desatoff | ............ | 340/540 |
| 5,957,034 A * | 9/1999 | Sham et al. | ............ | 99/285 |
| 6,095,031 A * | 8/2000 | Warne | ............ | 99/282 |
| 6,382,083 B2 * | 5/2002 | Schmed | ............ | 99/289 R |
| 6,481,339 B1 | 11/2002 | Castleberry | | |
| 7,028,603 B1 | 4/2006 | Gremillion et al. | | |
| 7,640,844 B2 * | 1/2010 | Wu et al. | ............ | 99/299 |
| 2004/0112224 A1 * | 6/2004 | Drobeck | ............ | 99/279 |
| 2005/0105395 A1 * | 5/2005 | Harrison | ............ | 368/10 |
| 2008/0121111 A1 * | 5/2008 | Paget et al. | ............ | 99/295 |
| 2009/0031902 A1 * | 2/2009 | White et al. | ............ | 99/289 R |

* cited by examiner

Primary Examiner — Sebastiano Passaniti
(74) Attorney, Agent, or Firm — Montgomery Patent & Design, LLC; Robert C. Montgomery; Joseph T. Yaksich

(57) ABSTRACT

An automatic drip coffeemaker with an automatically measured water metering means is herein disclosed. The apparatus also comprises a small flexible plastic water line which connects to the water source system, an in-line replaceable water filter to ensure clean filtered water, and a control circuit with automatic water sensing level switches to allow the user to select the desired amounts of cups to be made. While the exact water levels can vary per model of invention, selectable levels of a minimum to a maximum of cups of coffee would be envisioned as readily available. In such a manner the user only has to place the correct amount of ground coffee inside of the invention, select the proper number of cups to be made, and the invention will do the rest.

17 Claims, 4 Drawing Sheets

COFFEE MAKER WITH AUTOMATIC METERED FILLING MEANS

RELATED APPLICATIONS

The present invention was first described in and claims the benefit of U.S. Provisional Application No. 61/067,714 filed on Mar. 3, 2008, the entire disclosures of which are incorporated herein by reference.

FIELD OF THE INVENTION

The present invention relates generally to coffee making apparatuses and, more particularly, to said apparatuses which provide a means of automatic coffee making.

BACKGROUND OF THE INVENTION

People have enjoyed drinking coffee for hundreds of years its use spread from Asia through the Middle East and on its way to Europe. Various methods of coffee preparation exist and each method has its own unique characteristics which are suited to a variety of tastes and lifestyles. One (1) of the more popular methods of preparation is that of automatic drip brewing which tends to take much of the guesswork out of preparing coffee.

Commercial automatic coffee makers, as found in offices and restaurants, make coffee by the use of a self-contained water connection. In these machines, the user simply adds ground coffee beans and can simply initiate the preparation process to make an entire pot of great tasting coffee. Residential automatic coffee makers are common sites in most peoples' kitchens. Unfortunately, such convenience as mentioned is typically not offered in the residential arena due to the fact that people may make only make one (1) or two (2) cups of coffee. Thus disadvantageously, a residential coffee maker typically requires the user to pour the exact amount of water into a holding container prior to beginning the brewing process. While such a method does work, it requires additional time and effort on the part of a user which is typically not available during the morning rush to get out of the house. Additionally, the user must physically engage the coffee maker in order to initiate the brewing process.

Various attempts have been made in the past to overcome these problems and provide for a better means of automatic coffee preparation. Among the relevant attempts to address these problems are several U.S. Pat. Nos. 3,793,934; 4,094,233; 4,713,253; 5,285,718; 6,481,339; and 7,028,603. While these devices fulfill their respective, particular objective, each of these references suffers from one or more of the following disadvantages: multistage water delivery mechanisms for effective use in industrial settings; the use of probes or mechanical floats as a means of sensing water levels; cumbersome size; the use of internal pumps to deliver water between hot and cold storage tanks; and a control system which requires physical engagement.

Accordingly, there exists a need for an invention that operates without the disadvantages as described above and provides a means by which the ease and convenience of commercial coffee makers can be made available to residential users. The development of the invention herein described fulfills this need.

SUMMARY OF THE INVENTION

In view of the foregoing references, the inventor recognized a problem and observed that there is need for a coffeemaker with automatic metered filling means and thus the present invention is directed to an apparatus that satisfies this need.

The object of the present invention is to provide an automatic coffeemaker comprising a means to automatically deliver a predetermined amount of cold supply water which is filtered, heated, and dispensed upon standard coffee grounds as part of the brewing process.

Yet another object of the present invention is to provide an apparatus comprising a main enclosure and a user interface, an inlet water supply, a water filter, a water reservoir, cold water plumbing, hot water plumbing, a one way valve, a heating means, a shower head, a filter basket, a water actuating means, a water level sensing means, an electrical control means, a warming plate, a brewed coffee container, and a remote control.

Yet still another object of the present invention is to provide a user interface comprising control selector switches which enables a user to control and set the electronic programmable functions of the invention and a plurality of digital displays which provide a means of visual indication of the functions including a preset desired amount of brewed coffee, time, delay, and similar functions.

Yet still another object of the present invention is to provide an inlet water supply which provides a constant source of cold water supply to the invention. The cold water supply is routed through the inline water filter to provide contaminate free water to the water reservoir.

Yet still another object of the present invention is to provide a water actuating means comprising an electronic solenoid valve which controls the supply of inlet cold water as instructed by the electronic control means.

Yet still another object of the present invention is to provide a water level sensing means which enables the invention to deliver only the amount of cold water to the water supply as predetermined and set by the user. The water level sensing means comprises magnetic reed switches, a floating magnetic level switch, and a guide rod which signal to the electronic controller to stop the inflow of cold water via the water actuating means.

Yet still another object of the present invention is to provide cold water plumbing which delivers the cold water from the reservoir into a heat exchange tube which is adjacent to the heating means. The heat exchange tube provides a means of temporarily storing an amount of cold water and transferring heat from the heating means until the cold water boils. The hot water plumbing delivers the hot water from the heat exchange tube to the shower head for dispersal over the coffee grounds in the filter basket.

Yet still another object of the present invention is to provide a remote control which provides a means of wireless control of the programmable functions of the invention.

Yet still another object of the present invention is to provide an audible and visual indicator means for the programmable function of the invention.

Yet still another object of the present invention is to provide a method for utilizing a coffee maker with automatic metered filling means.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
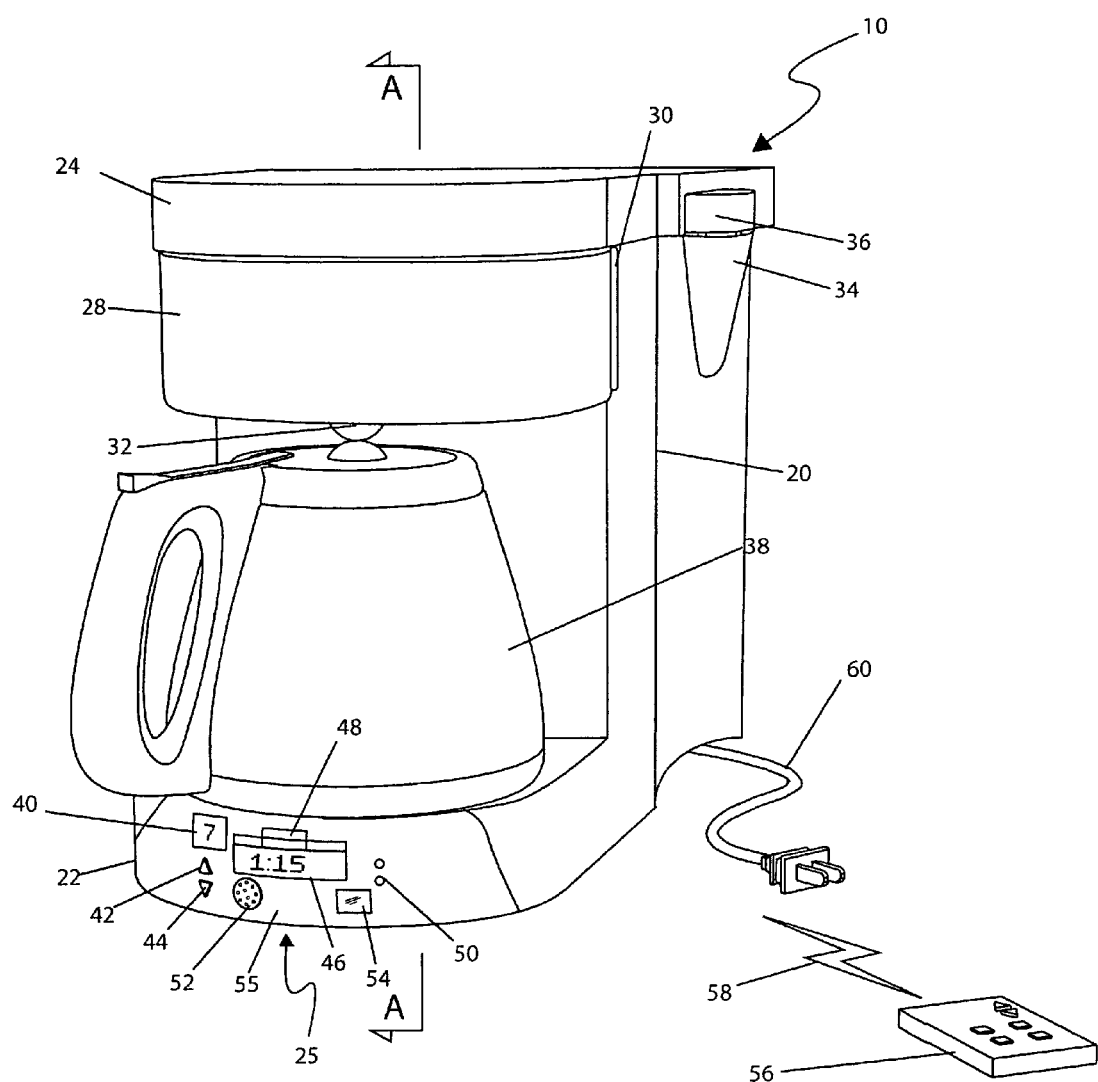
FIG. 1 is a front view of a coffee maker with automatic metered filling means 10, according to the preferred embodiment of the present invention.

10 coffee maker with automatic metered filling means
20 main enclosure
22 lower base
24 upper base
25 user interface
26 warmer plate
28 filter basket
30 hinge
32 auto-stop feature
34 water filter
36 fastening feature
38 carafe
40 first digital display
42 increase selector
44 decrease selector
46 second digital display
48 control selector panel
49 controller
50 indicator lights
52 speaker
54 infrared receiver
55 splash guard
56 remote control
58 infrared signal
60 power cord
62 water reservoir
63 cold water
64 cold water tube
66 hot water tube
68 heating element
70 shower head
72 drip head
74 one-way valve
76 heat exchange tube
78 sensors
80 wiring
82 inlet water supply line
84 solenoid valve
86 filter media
88 level switch
89 reed switch
90 guide rod
92 aperture
94 internal supply line
96 step down transformer
98 rectifying bridge assembly
100 control module
102 contactor
104 driver circuit

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a coffee maker with automatic metered filling means (herein described as the "apparatus") 10, which provides for automatic metering of a desired amount of water when preparing coffee comprising an improved automatic drip coffee maker. In conventional automatic drip coffee makers, a measured amount of cold water is poured into a reservoir. Inside the reservoir, a heating element heats the water to a boil. The steam rises through a tube and condenses. The condensed water is then distributed over the ground coffee in the filter. The water flows through the filter, infusing with the coffee, and falls into a carafe.

The present apparatus 10 generally comprises a main enclosure 20, a filter basket 28, an auto-stop feature 32, an inline water filter 34; an electronic controller 49, a removable carafe 38, and an automated metering means. The automated metering means generally comprises a control circuit having a plurality of water level sensing switches and an electronically controlled valve which enables a user to preselect a desired amount of cups of finished coffee which will be made. Electrical power for the apparatus 10 is provided by a power cord 60 of the common variety in residential, industrial, commercial and institutional environments.

The apparatus 10 is fabricated using common manufacturing techniques and materials such as, injection molded plastics, metal stamping, electrical component wiring assembly and the like.

Referring now to FIG. 1, a front view of the apparatus 10, according to the preferred embodiment of the present invention, is disclosed. FIG. 1 illustrates the main features embodying the apparatus 10 and it is understood that various physical embodiments comprising the inventive features may be made available having equal benefit and as such should not be interpreted as a limiting factor of the apparatus 10. The main enclosure 20 provides a counter-top housing means for the internal components of the apparatus 10 and is intended for use with a standard coffee carafe 38 which comprises common expected features such as a sufficiently thermally conductive body material, a handle, a hinged lid, a pouring spout, and the like.

A lower base 22 portion of the main enclosure 20 comprises a warmer plate 26 and a user interface 25. The warmer plate 26 is heated by a heating element 68 for maintaining the prepared coffee at a desired drinking temperature and provides a secure seating means thereto the carafe 38 once filled with freshly brewed coffee. The lower base 22 further comprises a user interface 25 which provides a means for the user to interact with the electronic control components of the apparatus 10; including digital displays 40, 46, indicator lights 50, and selection switches 42, 44, 48 each of which will be described in greater detail below.

Located on a front portion of the lower base 22 are at least two (2) digital displays. A first digital display 40 comprises an electronic numerical display which depicts the number of cups of coffee that the apparatus 10 is currently programmed to make. Selection of the number of cups is performed by two (2) control buttons comprising an increase selector switch 42 and a decrease selector switch 44. Also located near the first digital display 40 is a second digital display 46 and a control selection panel 48. An electronic controller 49 comprising a control module 100 and various input/output signals provides an operating means for the electronic functional control of the apparatus 10 such as, a clock/timer, an automatic delay timer control, coffee brew strength, and the like all of which are well known in the art. The second digital display 46 provides visual indicia of the electronic controller 49 embodied by a digital clock and status indicators which provide a means for the user to interface with the apparatus 10 and digitally program the various enabled functions of said apparatus 10. The control selection panel 48 comprises a plurality of control buttons which provide a means to navigate the programming process including initiating the coffee making process, setting the clock/timer, programming the time delay, setting an alarm function, muting a signaling speaker 52, and the like.

The speaker 52 comprises a common piezoelectric speaker which provides a signaling means to the user that a desired function is complete and as an alarm indication means. A plurality of signaling lights 50 are also provided which comprise small light emitting diodes (LED's) which provide a visual indication of performed functions to the user. The lower base 22 further comprises a transparent plastic splash guard 55 which provides a means of protecting the user interface from spilled or dripped liquids.

The apparatus 10 further comprises a hand-held infrared (IR) remote control 56 and a corresponding IR receiver 54 which is located along a front surface of the lower base 22. The remote control 56 enables initiation of the various functions of the apparatus 10 such as the ON/OFF function, selection of the number of cups, and timer functions, while at a distance via an IR signal 58. The remote control 56 comprises a small wireless handheld enclosure having an array of control buttons for adjusting various settings, common internal electronic components, and a power source such as a replaceable battery.

The filter basket 28 is hingedly attached to the upper base 24 via an integrally molded hinge 30. The filter basket 28 is located directly superjacent to the carafe 38 during use and can be swung out from the upper base 24 in order to be filled with a standard paper filter and ground coffee. The filter basket 28 may also be embodied in a filter basket with integral reusable filter assembly. An auto-stop feature 32 is provided comprising a lever actuated plunger assembly which enables the carafe 38 to be removed during the coffee making process without liquid dripping from said filter basket 28.

The water filter 34 comprises a common inline replaceable water filtration device which well known in the art and which is removably connected to the upper base 24. The water filter 34 further comprises a fastening feature 36 embodied by a threaded attachment with a locking ring which provides a simple means of connecting and removing said filter 34 from the apparatus 10 for replacement.

Figure 2:
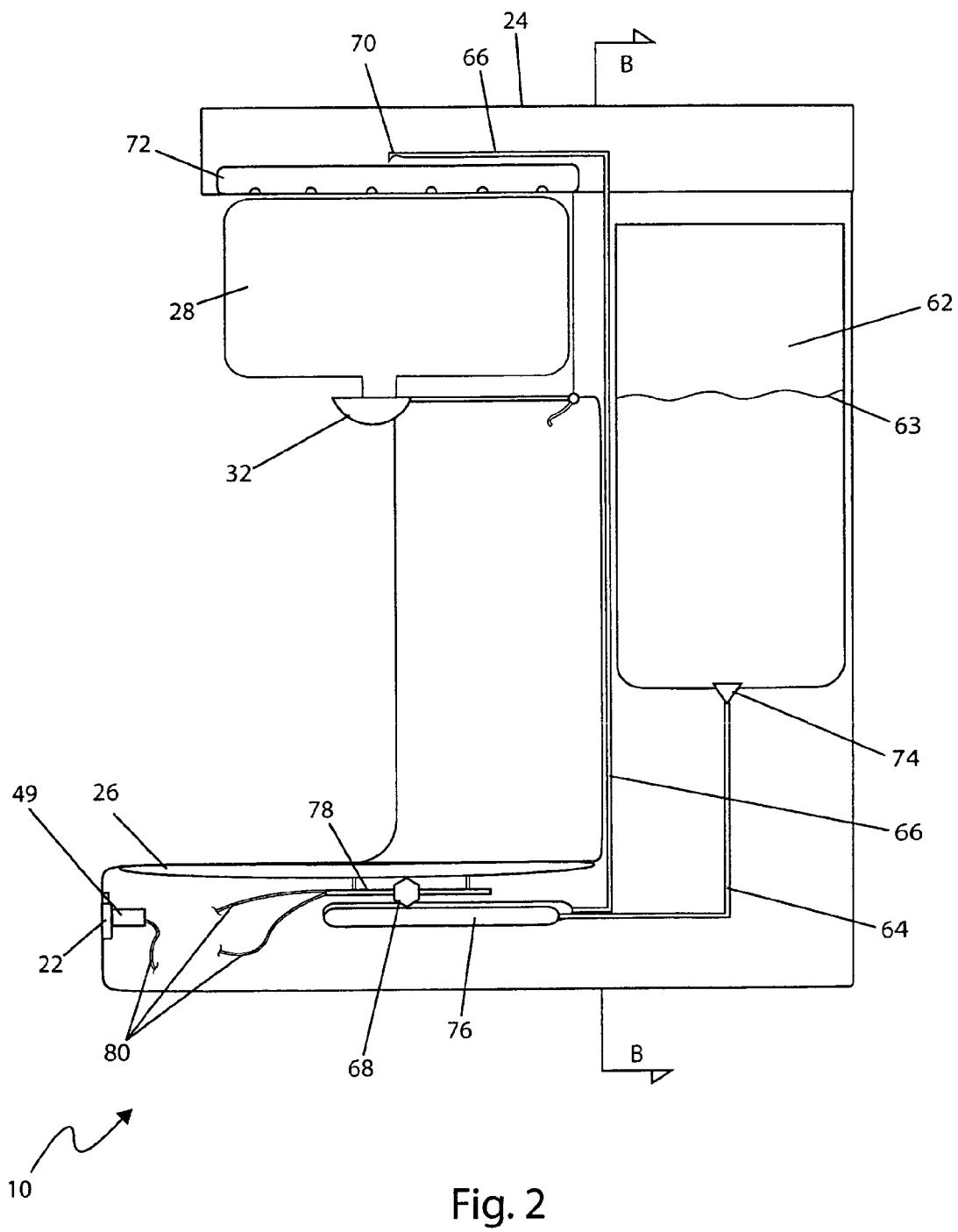
FIG. 2 is a section view taken along line A-A of the coffee maker with automatic metered filling means 10, according to the preferred embodiment of the present invention.

Referring next to FIG. 2, a section view taken along line A-A of the apparatus 10, according to the preferred embodiment, is disclosed. FIG. 2 more clearly illustrates the path of the water flow from the water reservoir 62 to the filter basket 28. The water reservoir 62 is located immediately above and behind the carafe 38 and is capable of holding an adequate amount of cold water 63 for brewing between a minimum of one (1) and a maximum number of cups of coffee, preferably between eight (8) to twelve (12) or more depending on the specific capabilities of the present apparatus 10. A cold water tube 64 provides a channeling means for a desired amount of cold water 63 from the reservoir 62 to a first end of a heat exchange tube 76 which is of sufficiently thermally conductive material, such as aluminum, and the heating element 68. The heating element 68 comprises a standard electrically resistive heater which is mounted between the warmer plate 26 and the heat exchange tube 76 via mechanical bracketry. The cold water 63 flows into the heat exchange tube 76 where said cold water 63 is heated to a boil. As the water boils, the bubbles of hot water rise up into a hot water tube 66 which is attached to a second end of the heat exchange tube 76. The hot water tube 66 is small enough and the bubbles of hot water are big enough that a column of water can ride upward on top of the bubbles. The hot water exits the hot water tube 66 via a shower head 70 and drips onto a drip head 72. The drip head 72 evenly distributes the hot water over the waiting coffee grounds within the filter basket 28 in an expected manner.

A one-way valve 74 is located inline with the cold water tube 64 and allows water to flow in only one direction, thereby enabling the cold water 63 to flow into the heat exchange tube 76, but forces the bubbles of boiling water to flow up the hot water tube 66. The one-way valve 74 is illustrated as located at the bottom of the reservoir 62 although the location can be near the entrance of the heat exchange tube 76 with equal benefit and as such should not be interpreted as a limiting factor of the apparatus 10.

To keep the heating element 68 from overheating, various components are provided such as, sensors 78 and fuses. The sensors 78 detect if the heating element 68 is getting too hot and will subsequently cut off the current. When the heating element 68 cools down, said sensors 78 reactivate the electrical current. This cycling keeps the heating element 68 at an even temperature. The fuses are for safety in the event the sensors 78 fail and simply cut the power if too high of a temperature is reached.

Figure 3:
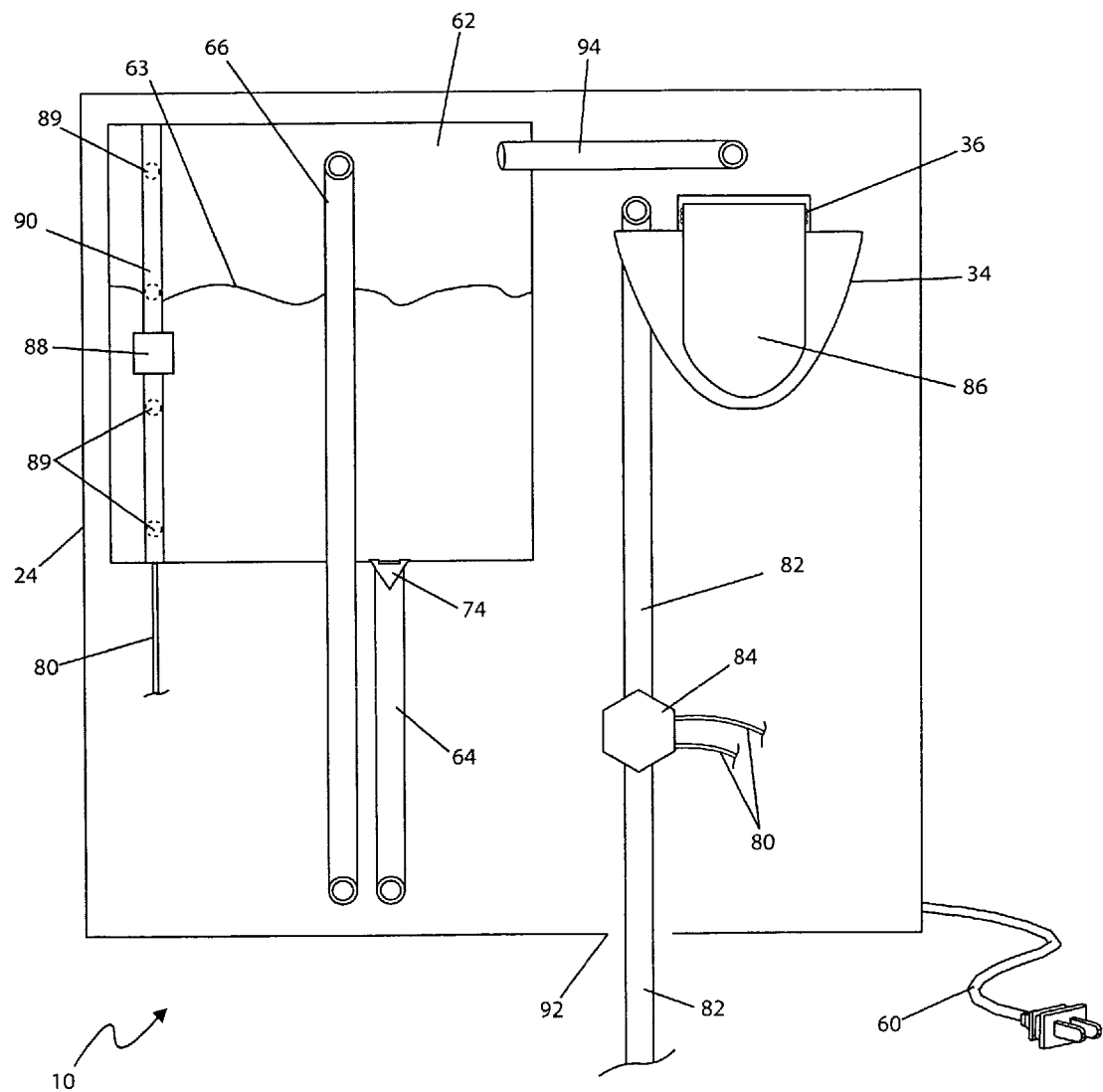
FIG. 3 is a sectional view taken along line B-B of the coffee maker with automatic metered filling means 10, according to the preferred embodiment of the present invention; and, FIG. 4 is an electrical block diagram embodying the major electrical principles of the coffee maker with automatic metered filling means 10, according to the preferred embodiment of the present invention.

Referring now to FIG. 3, a sectional view taken along line B-B of the apparatus 10, according to the preferred embodiment, is disclosed. FIG. 3 more clearly illustrates an internal inlet water supply 82 and inline water filter 34 plumbing configuration as well as the balance of components utilized at the rear of the coffee maker with automatic metered filling means 10. The water reservoir 62 is shown in a cutaway configuration to aid in the purposes of illustration. The apparatus 10 receives a constant supply of cold water 63 via the inlet water supply 82. The inlet water supply 82 comprises a length of lightweight polyethylene tubing which is easy to supply, route, and connect to a conventional water source as commonly found in a residential, commercial, industrial or institutional establishment as fed by a municipal water system or well. Preferably the inlet water supply 82 would connect via a standard plumbing fitting near a split valve under a sink basin, refrigerator water supply, or the like which enables simple water system integration. The inlet water supply 82 and fittings are used to facilitate the connection to the water source system in a manner currently and commonly used to feed ice makers or through the door water dispensers as commonly provided on current vintage refrigerators. An aperture 90 located on an underside of the main enclosure 20 provides a discreet access point for the inlet water supply line 82.

An inline electronic solenoid valve 84 comprising an electronically actuated valve provides a means of regulating the proper desired amount of water directed into the water reservoir 62. The electronic solenoid valve 84 is controlled by internal electronic circuitry 100 which will be described in greater detail herein below. The electronic solenoid valve 84 is preferably of the "energize to open variety" so any power failures, internal device failures, and the like will not allow for inadvertent operation and possible overfilling of the water reservoir 62. The solenoid valve 84 is powered and controlled via connection to the controller 49 via common wiring 80.

The water filter 34 is used to treat the incoming water from the inlet water supply line 82. The water filter 34 comprises an internal filter media 86 which removes impurities and contaminants and provides for better tasting coffee. The inlet water supply line 82 filters cold water 63 through the water filter 34 which is then directed to an internal supply line 94 which fills the water reservoir 62.

A magnetic level switch 88 and a plurality of magnetic reed switches 89 provide a means of controlling the amount of cold water 63 which is delivered into the water reservoir 62. The magnetic level switch 88 rides upon a guide rod 90. The guide rod 90 provides means of circuit closure to the various reed switches 89 which correspond to various levels of water in turn corresponding to various numbers of cups of brewed coffee. Further details on the operation of the various switches will be described herein below.

Figure 4:
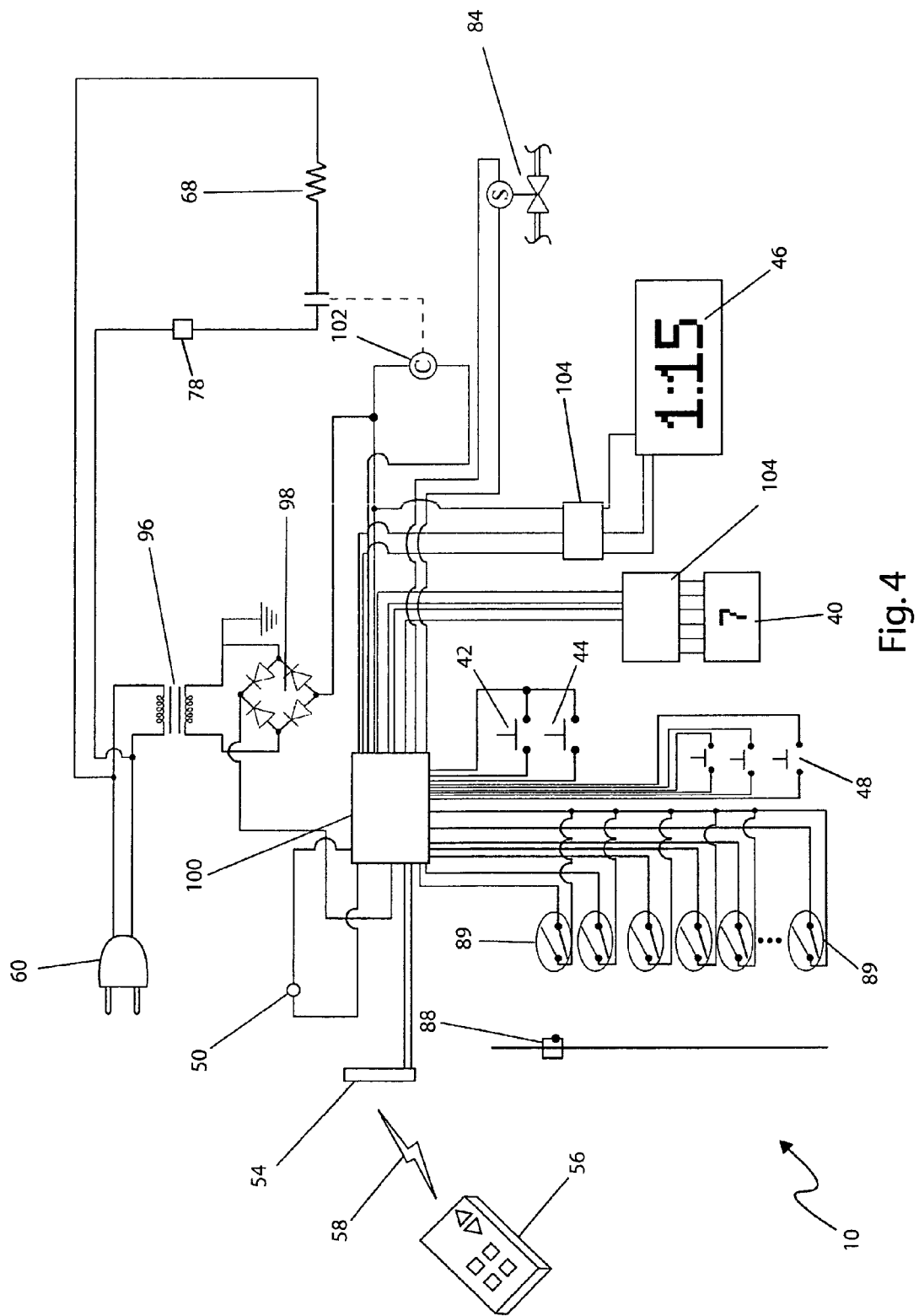

Finally, referring to FIG. 4, an electrical block diagram embodying the major electrical principles of the apparatus 10, according to the preferred embodiment of the present invention, is depicted. Electrical power at 120 VAC, 60 Hz is derived from the power cord 60 and delivered to a step down transformer 96. From the step down transformer 96 the reduced AC voltage is forwarded to a rectifying bridge assembly 98 for conversion into DC. This DC bus then energizes a control module 100. The control module 100 can be any type of control circuitry and is most likely envisioned as a dedicated hard programmed controller. However, other types of controllers such as hard-wired logic to basic stamp controller modules can be utilized, and as such should not be interpreted as a limiting factor of the present controller. Various inputs to the control module 100 are provided by the increase selector switch 42, the decrease selector switch 44, and the control selector panel 48 which are provided as switch inputs. Additional control signals may be provided thereto the control module 100 via transmitted IR signals 58 from the IR remote control 56 and received by the IR receiver 54, thereby initiating an ON/OFF function, number of cups, and timer functions.

The plurality of magnetic reed switches 89 are provided at the various boundaries of the various water levels on the water reservoir 62 (as seen in FIG. 3). The magnetic reed switches 89 operate by closing whenever the magnetic field of the magnetic level switch 88 passes by. In such a manner, a closed circuit is provided to the control module 100. When the corresponding magnetic reed switch 89 that matches the number of cups to be brewed which is indicated on the first digital display 40, the control module 100 opens the circuit to the solenoid valve 84 thus closing the valve and stopping the flow of water. Likewise, at the same time, the control module 100 closes a contactor 102 to energize the high wattage electric heating element 68 at line voltage to brew the coffee. Additional inputs to start the brewing cycles and set the delay timer, the brewing strength, and the clock as well as any other programmable features are provided by the control selector panel 48 as described. The first and the second digital displays are interfaced to the control module 100 by a driver circuit 104. After the completion of a brewing cycle, the control module 100 resets itself awaiting additional inputs via the push button control switches 42, 44, 48 or the IR remote control 56, to begin another brewing cycle.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the apparatus 10 would be manufactured in general accordance with FIGS. 1 through 4. After purchase by the final consumer the apparatus 10 would be located on a suitable flat surface such as a kitchen countertop. The apparatus 10 would be connected to a suitable water source using the inlet water supply line 82 and associated fittings using commonly known and widely available flexible plumbing connections. Next, apparatus 10 would be connected to a suitable source of electricity using the power cord 60. Finally, a coffee filter and ground coffee beans would be added to the filter basket 28 in a conventional manner. At this point in time, the apparatus 10 is ready to produce a desired programmable number of cups of coffee.

To begin the actual brewing process, the user would select the number of cups to be brewed by using the increase selector switch 42, the decrease selector switch 44, or the IR remote control 56 as necessary. To then immediately start the brewing process, a start signal would be generated by interfacing with the control selector panel 48 which includes a brewing initiation control, or by using the IR remote control 56, or the start signal would be generated on a delayed basis by use of the electronic timer control function of said control selector panel 48 in a well-known manner.

After the start sequence is initiated, the control module 100 will open the electronic solenoid valve 84 and allow water to begin to flow into the water reservoir 62. When the water level reaches the level that matches the amount of cold water 63 required to brew the desired number of cups of coffee, as set upon the first digital display 42, the control module 100 will de-energize and close the solenoid valve 84. At this point in the operating sequence, the water will be heated by the heating element 68 and pumped to the drip head 72. In a conventional gravity fed manner, the resultant finished coffee will drip into the carafe 38. At the completion of a timed brewing cycle as determined by the control module 100, the apparatus 10 will de-energize itself and wait for the process to begin anew as initiated as previously described.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An automatic coffee maker comprising:
a main enclosure, comprising a lower base portion, an upper base portion, a water reservoir within a rear portion thereof and comprising a one-way valve at a reservoir outlet, a heat exchanger in fluid communication with said water reservoir, a shower head in fluid communication with said heat exchanger, and a drip head in fluid communication with said shower head;
an inline water filter removably connected to said upper base portion of said main enclosure and in fluid communication with said water reservoir;
a filter basket hingedly attached to a front portion of said upper base portion of said main enclosure;
an electronic controlling means, further comprising a power supply means to said coffee maker and a control module for providing a plurality of desired controlling means for operating said coffee maker housed in said coffee maker;
a carafe removable to said lower base portion of said main enclosure subjacent to said filter basket; and,
an automated metering means in electronic communication with said electronic controlling means;
wherein said coffeemaker comprises a means to automatically deliver a predetermined amount of supply water which is filtered, heated, and dispensed upon ground coffee during a brewing process, wherein said ground coffee is placed in said coffee maker, an amount of water is placed in said coffee maker, said amount of water is filtered and heated prior to dispensing on said ground coffee, thereby producing prepared coffee, and said prepared coffee is dispensed to said carafe; and,
wherein said heat exchanger further comprises:
a first heat exchanger end and a second heat exchanger end comprising a thermally conductive material;
a heating element;
a cold water tube comprising a first cold water tube end in fluid communication with said one-way valve and a second cold water tube end in fluid communication with said first heat exchanger end; and,
a hot water tube having a first hot water tube end in fluid communication with said second heat exchanger end of the heat exchange tube and a second hot water tube end in fluid communication with said shower head;
wherein said heat exchanger is mounted into said main enclosure;
wherein said cold water tube conveys cold water from said water reservoir to said heat exchanger;
wherein said heating element provides a transfer of heat to said cold water, thereby producing hot water; and,
wherein said hot water tube conveys hot water to said shower head.

2. The coffee maker of claim 1, wherein said lower base portion further comprises:
a warmer plate, further comprising a heating element in electronic communication with said electronic controlling means;
a user interface located on a front portion of said lower base portion and in electronic communication with said electronic controlling means; and,
a splash guard covering said user interface, thereby providing a means of protecting said user interface from damage;
wherein said warming plate provides a means for maintaining a desired temperature as selected by said user;
wherein said warming pate provides a seating means and a heating means for said carafe and contents therein; and,
wherein said user interface provides a means for said user to selectively program a desired controlling function therefor said coffee maker.

3. The coffee maker of claim 2, wherein said user interface further comprises:
a first digital display, comprising an electronic numerical display which depicts an amount of said prepared coffee as selected by said user;
a second digital display adjacent to said first digital display, comprising a visual indicia thereof said electronic controlling means; and,
a control selection panel adjacent to said second digital display, comprising a plurality of control buttons providing a navigation means between each of said plurality of desired controlling means;
wherein said control selection panel provides said user to select said desired controlling function from said plurality of desired controlling means, wherein said desired controlling function is activated by said electronic controlling means.

4. The coffee maker of claim 3, wherein said first digital display further comprises an increase selector control switch and a decrease selector control switch.

5. The coffee maker of claim 3, wherein said second digital display further comprises a digital clock and a status indicator display means.

6. The coffee maker of claim 3, further comprising:
a speaker adjacent to said control selection panel and in electronic communication with said electronic controlling means; and,
a plurality of indicator lights adjacent to said control selection panel and in electronic communication with said electronic controlling means;
wherein said speaker provides an audible alerting means that said desired controlling function is complete; and,
wherein said plurality of indicator lights provides a visual alerting means that said desired controlling function is complete.

7. The coffee maker of claim 3, wherein said plurality of desired controlling means comprises:
an initiating means for said brewing process;
a brewing interrupt means for interrupting said brewing process;
a brewing strength setting means for setting a desired brewing strength;
a temperature setting means for setting said desired temperature of said warming plate;
a clock setting means for setting a clock setting;
a timer setting means for a desired time for initiating said brewing process;
a time delay setting means for delaying said brewing process; and,
a speaker muting means for muting a speaker.

8. The coffee maker of claim 7, wherein said plurality of desired controlling means is programmed with a hand-held remote control in electronic communication with said electronic controlling means;
wherein said remote control transmits a signal based on a user-selectable desired controlling function to a receiver located along a front surface of said lower base portion.

9. The coffee maker of claim 1, wherein said filter basket is hingedly attached to said upper base portion via an integrally molded hinge and further comprises a means to accept a filter filled with ground coffee, and an auto-stop feature, comprising a lever-actuated plunger assembly which enables said carafe to be removed during said brewing process while preventing liquid from dripping from said filter basket.

10. The coffee maker of claim 9, further comprising an integral reusable filter assembly.

11. The coffee maker of claim 1, wherein said inline water filter further comprises a fastening feature with a locking ring which provides a means of connecting and removing said in-line water filter from said coffee maker.

12. The coffee maker of claim 1, wherein said water reservoir comprises a maximum capacity of up to twelve (12) cups.

13. The coffee maker of claim 1, further comprising:
an inlet water supply line in fluid communication with a water supply source at a proximal end and in fluid communication with said inline water filter at a distal end;
a solenoid valve located along said inlet water supply line prior to said in-line water filter and in electronic communication therewith said electronic controlling means;
wherein said inlet water supply line enters said enclosure at a bottom portion thereof.

14. The coffee maker of claim 13, wherein said water reservoir further comprises:
a magnetic level switch;
a plurality of magnetic reed switches located in said water reservoir, each corresponding to a water level in said water reservoir; and,
a guide rod supporting said magnetic level switch, thereby providing a water delivery controlling means from said inlet water line delivered into the water reservoir;
wherein said guide rod provides a circuit closure means to said plurality of magnetic reed switches said magnetic level switch;
wherein said water level corresponds to a particular amount of prepared coffee produced during said brewing process;
wherein a user selects a desired amount of said prepared coffee with said electronic controlling means, thereby indicating a particular magnetic reed switch corresponding to a particular water level, wherein said solenoid valve opens up to allow a flow of water into said water reservoir until said magnetic level switch reaches said particular magnetic reed switch, wherein said solenoid valve closes to cease aid flow of water;
wherein a bottommost magnetic reed switch sends a signal to said electronic controlling means to indicate an end of said brewing process; and,
wherein a topmost magnetic reed switch sends a signal to said electronic controlling means to close send solenoid control valve to prevent an overflow.

15. The coffee maker of claim 14, wherein said drip head evenly distributes said hot water onto said ground coffee.

16. The coffee maker of claim 1, further comprising an overheating override means for said heating element in electronic communication with said electronic controlling means;
wherein when said overheating override means detects said heating element reaching a predetermined temperature, said electronic controlling means interrupts power to said heating element; and,
wherein said overheating override means provides a means for maintaining an even temperature.

17. The coffee maker of claim 1, wherein said carafe further comprises a thermally conductive body material, a handle, a hinged lid comprising an inlet for receiving said prepared coffee, and pouring spout for dispensing said prepared coffee.

* * * * *